United States Patent
Kang et al.

(10) Patent No.: US 8,319,642 B2
(45) Date of Patent: Nov. 27, 2012

(54) RADIO FREQUENCY IDENTIFICATION DEVICE HAVING NONVOLATILE FERROELECTRIC MEMORY

(75) Inventors: Hee Bok Kang, Chungcheongbuk-do (KR); Jin Hong An, Gyeonggi-do (KR); Suk Kyoung Hong, Gyeonggi-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 933 days.

(21) Appl. No.: 12/135,262

(22) Filed: Jun. 9, 2008

(65) Prior Publication Data

US 2009/0058654 A1    Mar. 5, 2009

(30) Foreign Application Priority Data

Aug. 31, 2007    (KR) .................. 10-2007-0088152

(51) Int. Cl.
*G08B 13/14* (2006.01)
(52) U.S. Cl. ..................................... 340/572.1; 365/145
(58) Field of Classification Search .................. 365/145; 340/572.1
See application file for complete search history.

(56) References Cited

U.S. PATENT DOCUMENTS

| 5,890,199 | A  | * | 3/1999  | Downs ............................. 711/106 |
| 6,031,753 | A  | * | 2/2000  | Kang et al. ..................... 365/145 |
| 6,141,237 | A  | * | 10/2000 | Eliason et al. ................. 365/145 |
| 7,114,659 | B2 |   | 10/2006 | Harari et al. |
| 2005/0117379 | A1 | * | 6/2005 | Kang ............................. 365/145 |
| 2007/0018821 | A1 | * | 1/2007 | Kang et al. ................. 340/572.1 |
| 2007/0081671 | A1 | * | 4/2007 | Ross et al. ..................... 380/255 |
| 2007/0171693 | A1 |   | 7/2007 | Koyama |

FOREIGN PATENT DOCUMENTS

JP    2001-283174 A    10/2001
JP    2005-301591 A    10/2005
* cited by examiner

*Primary Examiner* — Hoai V Ho
*Assistant Examiner* — Tri Hoang
(74) *Attorney, Agent, or Firm* — Ladas & Parry LLP

(57) ABSTRACT

A RFID device having an analog block, a digital block, and a memory block having a nonvolatile ferroelectric memory is presented. The analog block is configured to receive a radio frequency signal so as to output an operating command signal. The digital block is configured to generate and output an address and an operation adjusting signal in response to the operating command signal. The digital block is also configured to output a response signal to the analog block and to generate a flag data corresponding to a data processing state and value. The memory block is configured to read and write a data in a nonvolatile ferroelectric capacitor in response to the operation adjusting signal. The memory block includes a memory unit configured to store the flag data so as to output the flag data to the digital block.

23 Claims, 8 Drawing Sheets

RADIO FREQUENCY IDENTIFICATION DEVICE HAVING NONVOLATILE FERROELECTRIC MEMORY

CROSS-REFERENCE TO RELATED APPLICATION

This application is based upon and claims the benefit of priority to Korean Patent Application No. 10-2007-0088152, filed on Aug. 31, 2007, the entire contents of which are incorporated herein by reference.

BACKGROUND OF THE INVENTION

The present invention relates generally to a Radio Frequency Identification (RFID) device having a nonvolatile ferroelectric memory, and more particularly to a RFID device having a nonvolatile ferroelectric memory for storing data processing states and values of a RFID tag when the power supply is interrupted.

Generally, a nonvolatile Ferroelectric Random Access Memory (FeRAM), which has about the same data processing speeds of a Dynamic Random Access Memory (DRAM), is spotlighted as possibly being a next generation memory device capable of conserving data even when the power is off.

FeRAM is structurally similar to DRAM in general, but FeRAM includes capacitors made of a ferroelectric substance having a high residual polarization, by which data retention is possible even after power is no longer provided to the FeRAM.

A RFID device includes a reader configured to automatically recognize an object equipped with an electric tag and to read information from it. RFID devices are widely used in inventory control, supply chain management, and factory automation due to their relatively rapid recognition performance speed and their large data storage capacity.

A RFID device includes a RFID reader and a RFID tag. The RFID reader includes an internal or external antenna. The antenna outputs an activating signal to radiate an electromagnetic field such as a RF field.

When a given RFID tag is exposed within a given RF field, the RFID tag receives the activating signal from the antenna of the RFID reader. By using the received activating signal to power up the RFID tag, the RFID tag can then subsequently transmit information stored in the RFID tag to the RFID reader.

That is, when the RFID tag is exposed within the RF field, an inducing voltage is generated in an antenna coil equipped in the RFID tag. The inducing voltage can then be rectified as a DC voltage and subsequently used as a power source required in a chip of the RFID tag. That is, the chip of the RFID tag is operated or activated when a given induced voltage is applied. Consequently, the data stored in a memory of the RFID tag can then be transmitted to a RFID reader.

When a number of different RFID tags is present within a reading range of the RFID reader, the RFID reader must be able to judge the data processing state of each RFID tag. A conventional RFID tag receives a RF signal to generate an induced power source therein. That induced power source is instantly disconnected depending on a state of the RF signal so that a current data processing state and value of the RFID tag can be eliminated. As a result, it is impossible to judge whether any one of the different RFID tags has already communicated with the RFID reader when exposed within the RF field emitted from the RF reader.

Furthermore, a conventional RFID tag must be re-initialized when the power source is re-supplied so as to re-process data in the RFID tag. Accordingly, the conventional RFID tag suffers delays in data processing speeds. Yet further, other data or information may have changed subsequent to being processed during a previous data processing event.

SUMMARY OF THE INVENTION

Various embodiments are directed at providing a RFID device having a nonvolatile ferroelectric memory configured to store a data processing state and value of a RFID tag while power supply is stopped.

Various embodiments are directed at providing a RFID device having a nonvolatile ferroelectric memory that may reduce a layout area with a ferroelectric capacitor of high capacity.

Various embodiments are directed at providing a RFID device having a nonvolatile ferroelectric memory configured to change and adjust a time for storing a data processing state and value of a RFID tag.

According to an embodiment of the present invention, a RFID device comprises: an analog block configured to receive a radio frequency signal so as to output an operating command signal; a digital block configured to generate and output an address and an operation adjusting signal in response to the operating command signal, output a response signal to the analog block and generate a flag data corresponding to a data processing state and value; and a memory block configured to read and write a data in a nonvolatile ferroelectric capacitor in response to the operation adjusting signal. The memory block includes a memory unit configured to store the flag data so as to output the flag data to the digital block.

DETAILED DESCRIPTION

Figure 1:
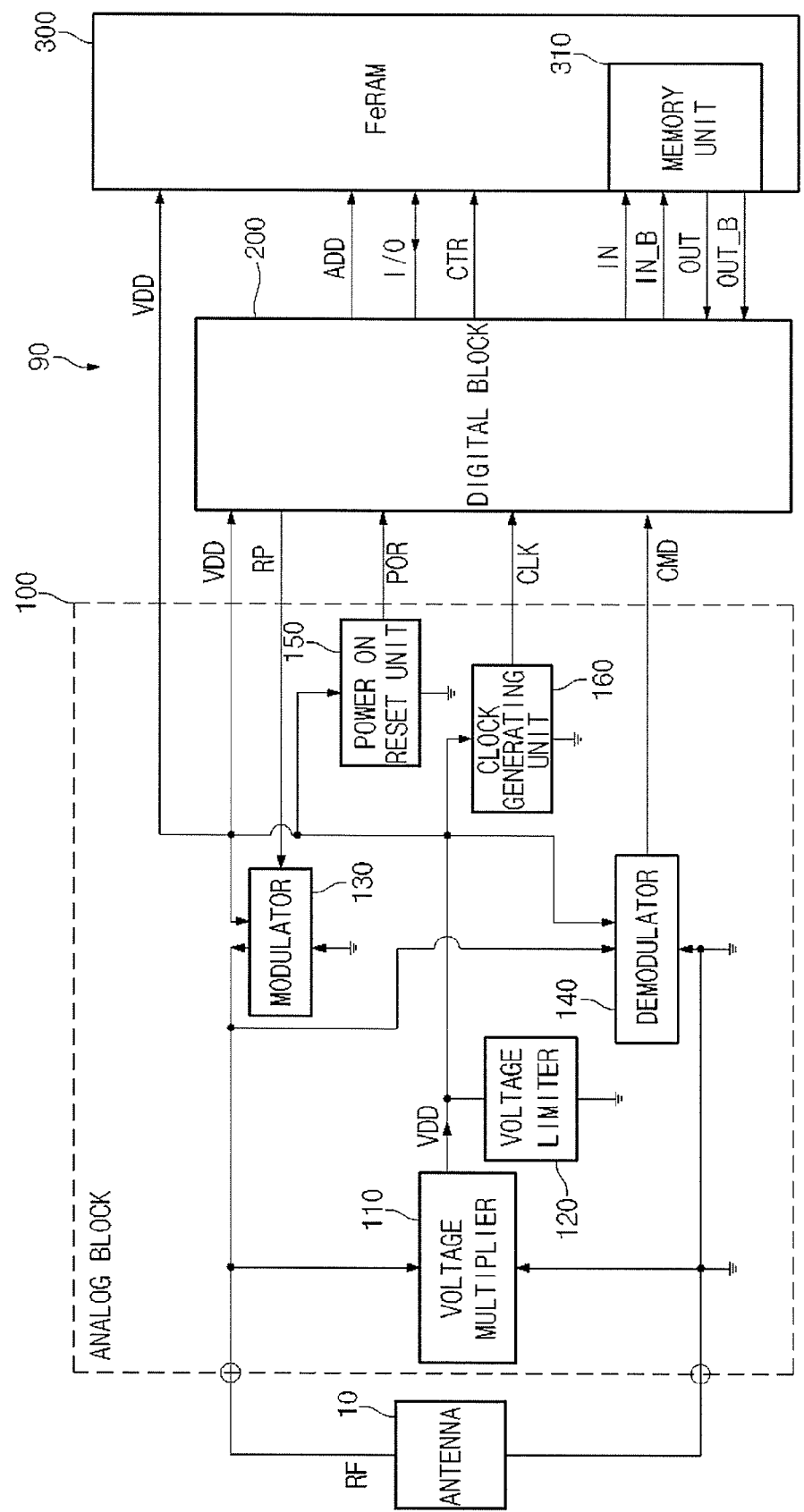
FIG. 1 is a block diagram illustrating a RFID device having a nonvolatile ferroelectric memory according to an embodiment of the present invention.

FIG. 1 is a block diagram illustrating a RFID device 90 having a nonvolatile ferroelectric memory according to an embodiment of the present invention.

The RFID device 90 comprises an analog block 100, a digital block 200 and a nonvolatile FeRAM 300.

The analog block 100 comprises a voltage multiplier 110, a voltage limiter 120, a modulator 130, a demodulator 140, a power on reset unit 150 and a clock generating unit 160.

An antenna 10 of the analog block 100 transmits and receives radio frequency signals RF between an external reader or writer (not shown) and the RFID device. The voltage multiplier 110 generates an induced power voltage VDD which is used as a driving voltage for the RFID device 90 when the radio frequency signal RF is received from the antenna 10. The voltage limiter 120 limits a transmission voltage of the radio frequency signal RF received from the antenna 10 to output the voltage to the demodulator 140 and the clock generating unit 160.

The modulator 130 modulates a response signal RP received from the digital block 200 to transmit the signal to the antenna 10. The demodulator 140 detects an operating command signal from the radio frequency signals RF received from the antenna 10 depending on the output voltages of the voltage multiplier 110 and the voltage limiter 120, and subsequently outputs a command signal CMD to the digital block 200.

The power on reset unit 150 senses an output voltage VDD of the voltage multiplier 110, and subsequently outputs a power on reset signal POR for controlling a reset operation to the digital block 200. The clock generating unit 160 supplies a clock CLK for controlling the operation of the digital block 200 to the digital block 200 depending on the output voltage VDD of the voltage multiplier 110.

The digital block 200 receives the induced power voltage VDD, the power on reset signal POR, the clock CLK and the command signal CMD from the analog block 100. The digital block 200 analyzes the command signal, and subsequently generates control signals and processing signals to output the response signal RP corresponding to the analog block 100. The digital block 200 also outputs an address ADD, input/output data I/O, a control signal CTR, a temperature sensor activating signal TEMP_CMD for driving a temperature sensor and a temperature compensating signal CAL_CMD to the FeRAM 300.

The FeRAM 300 is a memory block configured to read and write a data by using a nonvolatile ferroelectric capacitor. The FeRAM 300 includes a memory unit 310.

The memory unit 310 of the FeRAM 300 receives a flag data input signals IN, IN_B from the digital block 200 and subsequently stores these signals for a given time period. The memory unit 310 also outputs flag data output signals OUT, OUT_B to the digital block 200.

The flag data input signal IN_B is an inversion signal of the flag data input signal IN, and the flag data output signal OUT_B is an inversion signal of the flag data output signal OUT.

The memory unit 310 is a short term memory configured to store a state of a flag data when supply of the operating voltage VDD of the RFID tag is suddenly interrupted or when the state of the flag data is changed. As a result, the memory unit 310 maintains the stored value for a short term.

A maintaining time period of the value stored in the memory unit 310 ranges within several seconds. A programming time period, that is a write time period, of the memory unit 310 is expected to be a short amount of time of less than about 2 ms. As a result, the FeRAM exhibits a different property from those volatile memories such as SRAM, DRAM and from those nonvolatile memories such as EEPROM.

Figure 2:
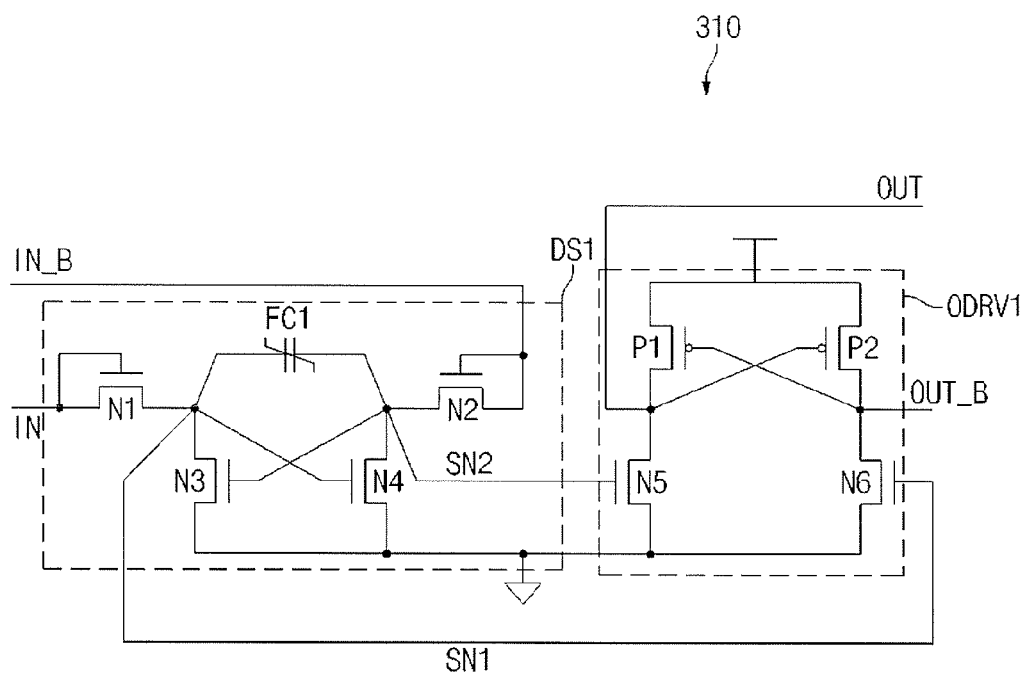
FIG. 2 is a circuit diagram illustrating a memory unit according to an embodiment of the present invention.

FIG. 2 is a circuit diagram illustrating the memory unit 310 according to an embodiment of the present invention.

The memory unit 310 includes a data storage unit DS1 and an output driving unit ODRV1.

The data storage unit DS1 includes NMOS transistors N1~N4 and a ferroelectric capacitor FC1. The NMOS transistor N1, a transmission element, is connected between a flag data input signal IN receiving terminal and a storage node SN1, in which the gate of the NMOS transistor N1 receives the flag data input signal IN.

The NMOS transistor N2, a transmission element, is connected between a storage node SN2 and a flag data input signal IN_B receiving terminal, in which the gate of the NMOS transistor N2 receives the flag data input signal IN_B.

The NMOS transistors N3, N4, latch units, are cross-coupled to have a latch structure. The NMOS transistor N3 is connected between the storage node SN1 and a ground voltage terminal in which the gate of the NMOS transistor N3 is connected to the storage node SN2. The NMOS transistor N4 is connected between the storage node SN2 and the ground voltage terminal in which the gate of the NMOS transistor N4 is connected to the storage node SN1. The ferroelectric capacitor FC1, a data storage element, is connected between the storage node SN1 and the storage node SN2.

An output driving unit ODRV1 includes PMOS transistors P1, P2 and NMOS transistors N5, N6. The PMOS transistors P1, P2 and the NMOS transistors N5, N6 are configured as a level shifter structure.

The PMOS transistors P1, P2, pull-up driving units, are cross-coupled to have a pull-up latch structure. The PMOS transistor P1 is connected between a power voltage terminal and a flag data output signal OUT output terminal in which the gate of the PMOS transistor P1 is connected to a flag data output signal OUT_B output terminal. The PMOS transistor P2 is connected between the power voltage terminal and the flag data output signal OUT_B output terminal in which the gate of the PMOS transistor P2 is connected to the flag data output signal OUT output terminal.

The NMOS transistor N5, a pull-down driving element, is connected between a drain of the PMOS transistor P1 and the ground voltage terminal in which the gate of the NMOS transistor N5 is connected to the storage node SN2. The NMOS transistor N6, a pull-down driving element, is connected between a drain of the PMOS transistor P2 and the ground voltage terminal in which the gate of the NMOS transistor N6 is connected to the storage node SN1.

Hereinafter, the operation of the memory unit 310 is described.

When the flag data input signal IN is applied at a power voltage VDD level, the NMOS transistor N1 is turned on. The NMOS transistor N2 is maintained in a state of being turned-off.

A voltage of the flag data input signal IN is charged in the storage node SN1 and the ferroelectric capacitor FC1. The NMOS transistor N4 is turned on to discharge the flag data input signal IN charged in the storage node SN2 into the ground voltage terminal.

When the NMOS transistor N6 and the PMOS transistor P1 are turned on to output the flag data output signal OUT at the power voltage VDD level. The flag data output signal OUT_B is outputted at a ground voltage level. The flag data output signal OUT is outputted to the digital block 200 and re-stored.

When the power voltage VDD drops below a critical voltage, the flag data input signals IN, IN_B are reset at a ground voltage VSS level. As a result, states of the storage nodes SN1, SN2 are maintained for a given time period. A maintaining time period of the states of the storage nodes SN1, SN2 is determined by the capacity of the ferroelectric capacitor FC1 and the amount of leakage current flowing in the NMOS transistors N1~N4.

When the capacity of the ferroelectric capacitor FC1 is relatively large and the amount of leakage currents flowing in the NMOS transistors N1~N4 are relatively small, the maintaining time period becomes longer. As a result, a flag data is maintained for a given time period when a power source is interrupted or terminated.

When a level of the power voltage VDD rises again, the flag data input signal IN rises from a reset state to the power voltage VDD level. When the power voltage VDD does not drop below a critical voltage, the flag data input signal IN rises from the dropped voltage level to the power voltage VDD level. Accordingly, the NMOS transistor N1 is turned on to re-charge the storage node SN1.

When the supply of the power voltage VDD is suddenly terminated or the state of the flag data is changed, the flag data is stored in the memory unit 310 for a given time. When the power voltage VDD is re-supplied, a state machine in the digital block 200 reads and re-writes the flag data stored in the memory unit 310.

Figure 3:
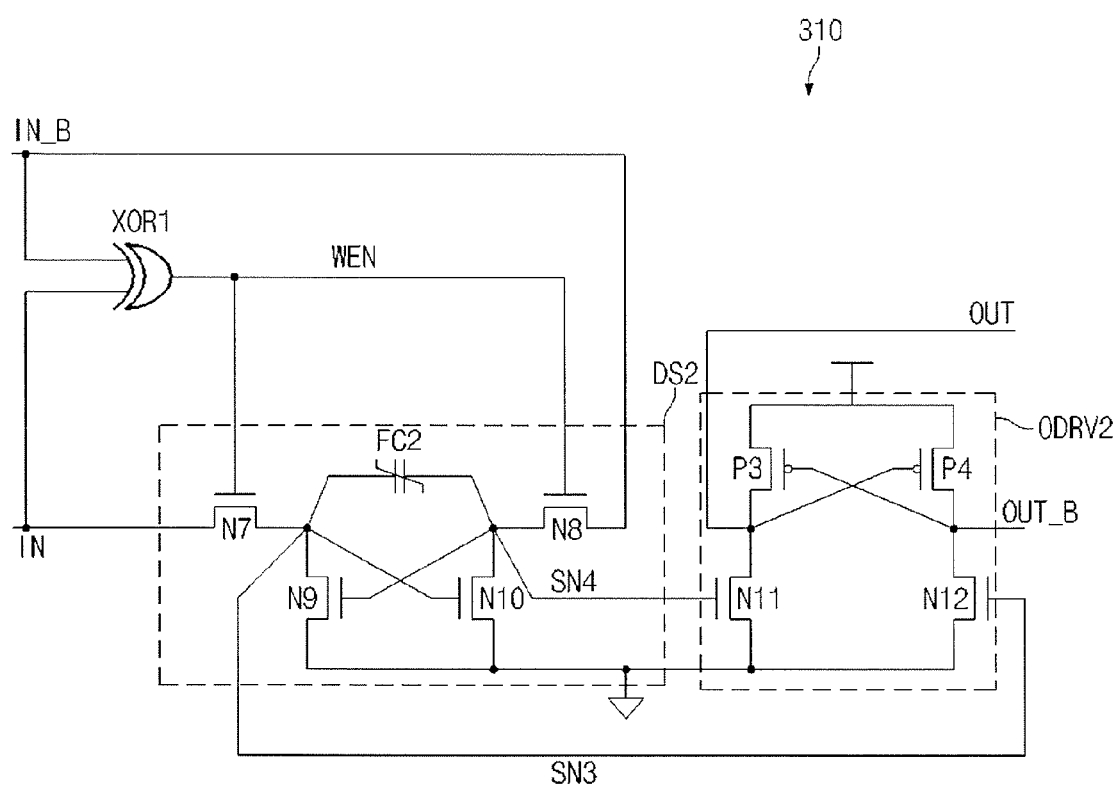
FIG. 3 is a circuit diagram illustrating a memory unit according to an embodiment of the present invention.

FIG. 3 is a circuit diagram illustrating a memory unit according to an embodiment of the present invention.

The memory unit 310 includes an exclusive OR gate XOR1, a data storage unit DS2 and an output driving unit ODRV2.

The exclusive OR gate XOR1, which is a comparator, compares the flag data input signal IN with the flag data input signal IN_B. The exclusive OR gate XOR1 performs an exclusive OR operation on the flag data input signal IN with the flag data input signal IN_B to output a write enable signal WEN. The write enable signal WEN is outputted at a high level when a potential difference is generated between the flag data input signals IN and IN_B.

The data storage unit DS2 includes NMOS transistors N7~N10 and a ferroelectric capacitor FC2. The NMOS transistor N8, which is a transmission element, is connected between a flag data input signal IN receiving terminal and a storage node SN3 in which the gate of the NMOS transistors N7 receives a write enable signal WEN.

The NMOS transistor N8, which is a transmission element, is connected between a storage node SN4 and a flag data input signal IN_B receiving terminal in which the gate of the NMOS transistor N8 receives the write enable signal WEN.

The NMOS transistors N9, N10 are cross-coupled to have a latch structure. The NMOS transistor N9 connected between the storage node SN3 and a ground voltage terminal has a gate connected to the storage node SN4. The NMOS transistor N10 is connected between the storage node SN4 and the ground voltage terminal in which the gate of the NMOS transistor N10 is connected to the storage node SN3. The ferroelectric capacitor FC2 is connected between the storage nodes SN3 and SN4.

The output driving unit ODRV2 includes PMOS transistors P3, P4 and NMOS transistors N11, N12. The PMOS transistors P3, P4 and the NMOS transistors N11, N12 have a level shifter structure.

The PMOS transistors P3, P4, which are pull-up driving units, are cross-coupled to have a latch structure. The PMOS transistor P3 is connected between a power voltage terminal and a flag data output signal OUT output terminal in which the gate of the PMOS transistor P3 is connected to a flag data output signal OUT_B output terminal. The PMOS transistor P4 is connected between the power voltage terminal and the flag data output signal OUT_B output terminal in which the gate of the PMOS transistor P4 is connected to the flag data output signal OUT output terminal.

The NMOS transistor N11, which is a pull-down driving unit, is connected between the ground voltage terminal and a drain of the PMOS transistor P3 in which the gate of the NMOS transistor N11 is connected to the storage node SN4. The NMOS transistor N12, which is a pull-down driving unit, is connected between the ground voltage terminal and a drain of the PMOS transistor P4 in which the gate of the NMOS transistor N12 is connected to the storage node SN3.

Hereinafter, the operation of the memory unit 310 is described.

In a write mode, the flag data input signal IN is applied at a power voltage VDD level, and the flag data input signal IN_B is applied at a ground voltage VSS level.

The flag data input signal IN has a logic opposite to that of the flag data input signal IN_B, so that the write enable signal WEN is outputted at a high level. As a result, the NMOS transistors N7, N8 are turned on simultaneously.

A voltage of the flag data input signal IN is charged in the storage node SN3 and the ferroelectric capacitor FC2. The NMOS transistor N10 is turned on to discharge a potential of the storage node SN4 to the ground voltage terminal. The NMOS transistor N9 is maintained at a turned-off condition.

The NMOS transistor N12 is turned on to output the flag data output signal OUT_B at the ground voltage VSS level. The PMOS transistor P3 is turned on to output the flag data output signal OUT at the power voltage VDD level. The flag data output signal OUT is re-stored in the digital block 200.

When the power voltage VDD drops below a critical voltage, the flag data input signals IN, IN_B are reset at the ground voltage VSS level. Consequently, the write enable signals WEN is set at a low level, so that the NMOS transistors N7, N8 are set in a turned off condition.

As a result, states of the storage nodes SN3, SN4 are maintained for a given time period. The maintaining time period of the storage nodes SN3, SN4 is determined by the capacity of the ferroelectric capacitor FC2 and the amount of leakage current flowing in the NMOS transistors N7~N10.

When the capacity of the ferroelectric capacitor FC2 is large and the amount of leakage current flowing in the NMOS transistors N7~N10 is small, the maintaining time period becomes longer. As a result, a flag data is maintained for a given time when a power source is off.

When a level of the power voltage VDD rises again, the flag data input signal IN rises from a reset state to the power voltage VDD level. When the power voltage VDD does not drop below a critical voltage, the flag data input signal IN rises from the dropped voltage level to the power voltage VDD level.

The write enable signal WEN is then set at the high level again and the NMOS transistors N7, N8 are turned on to charge the storage node SN3.

Figure 4:
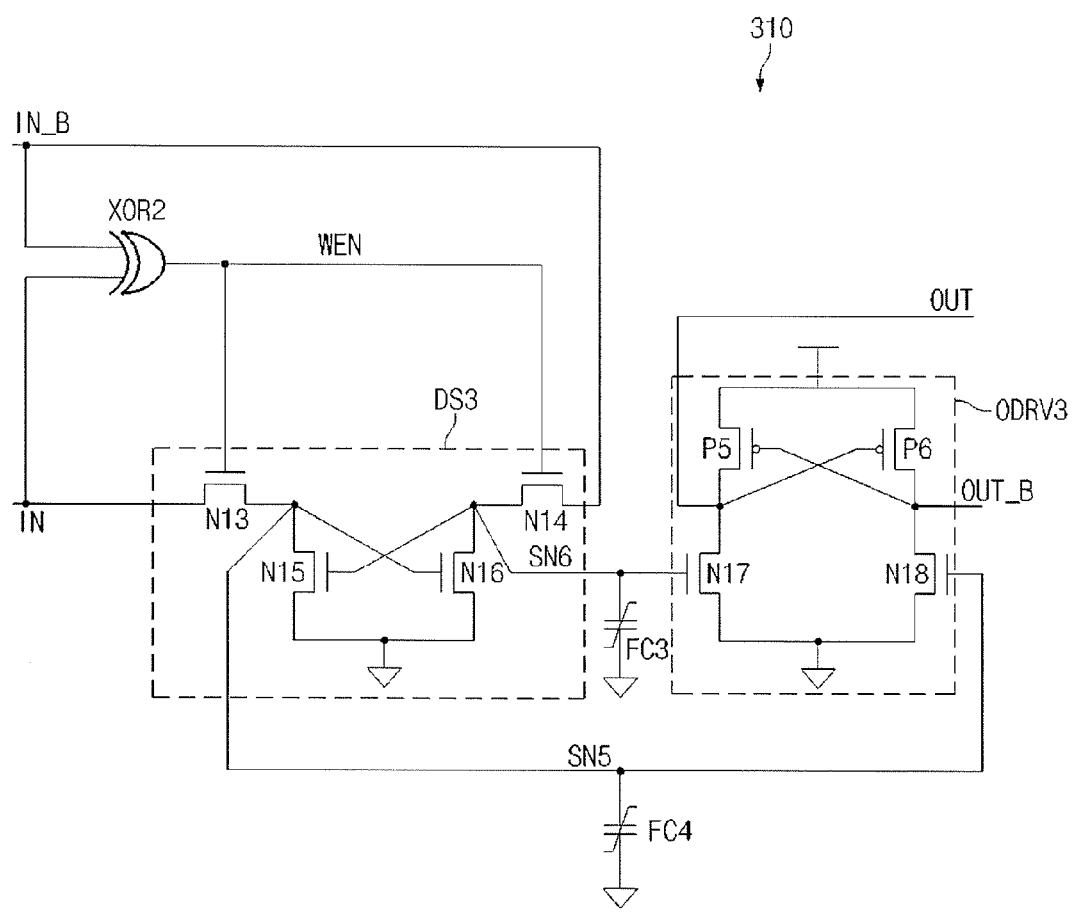
FIG. 4 is a circuit diagram illustrating a memory unit according to an embodiment of the present invention.

FIG. 4 is a circuit diagram illustrating the memory unit 310 according to an embodiment of the present invention.

The memory unit 310 includes an exclusive OR gate XOR2, a data storage unit DS3, an output driving unit ODRV3 and ferroelectric capacitors FC3, FC4.

The exclusive OR gate XOR2, which is a comparator, compares the flag data input signal IN with the flag data input signal IN_B. The exclusive OR gate XOR2 performs an exclusive OR operation on the flag data input signal IN with the flag data input signal IN_B to output a write enable signal WEN.

The data storage unit DS3 includes NMOS transistors N13~N16. The NMOS transistor N13, which is a transmission element, connected between a flag data input signal IN receiving terminal and a storage node SN5 has a gate to receive the write enable signal WEN.

The NMOS transistor N14, which is a transmission element, is connected between a storage node SN6 and a flag data input signal IN_B receiving terminal in which the gate of the NMOS transistor N14 receives the write enable signal WEN.

The NMOS transistors N15, N16, which are latch units, are cross-coupled to have a latch structure. The NMOS transistor N15 is connected between the storage node SN5 and a ground voltage terminal in which the gate of the NMOS transistor N15 is connected to the storage node SN6. The NMOS transistor N16 is connected between the storage node SN6 and the ground voltage terminal in which the gate of the NMOS transistor N16 is connected to the storage node SN5.

The output driving unit ODRV3 includes PMOS transistors P5, P6 and NMOS transistors N17, N18. The PMOS transistors P5, P6 and the NMOS transistors N17, N18 have a level shifter structure.

The PMOS transistors P5, P6, which are pull-up driving units, are cross-coupled to have a latch structure. The PMOS transistor P5 is connected between a power voltage terminal and a flag data output signal OUT output terminal in which the gate of the PMOS transistor P5 is connected to a flag data output signal OUT_B output terminal. The PMOS transistor P6 is connected between the power voltage terminal and the flag data output signal OUT_B output terminal in which the gate of the PMOS transistor P6 is connected to the flag data output signal OUT output terminal.

The NMOS transistor N17, which is a pull-down driving unit, is connected between the ground voltage terminal and a drain of the PMOS transistor P5 in which the gate of the NMOS transistor N17 is connected to the storage node SN6. The NMOS transistor N18, which is a pull-down driving unit, is connected between the ground voltage terminal and a drain of the PMOS transistor P6 in which the gate of the NMOS transistor N18 is connected to the storage node SN5.

The ferroelectric capacitor FC3, which is a storage element, is connected between the storage node SN6 and the ground voltage terminal. The ferroelectric capacitor FC4 is connected between the storage node SN5 and the ground voltage terminal.

Hereinafter, the operation of the memory unit 310 is described.

In a write mode, the flag data input signal IN is applied at a power voltage VDD level, and the flag data input signal IN_B is applied at a ground voltage VSS level.

The flag data input signal IN has a logic opposite to that of the flag data input signal IN_B, so that the write enable signal WEN is outputted at a high level. As a result, the NMOS transistors N13, N14 are turned on simultaneously.

A voltage of the flag data input signal IN is charged in the storage node SN5 and the ferroelectric capacitor FC4. The NMOS transistor N16 is turned on to discharge a potential of the storage node SN6 to the ground voltage terminal. The NMOS transistor N15 keeps being turned-off.

The NMOS transistor N18 is turned on to output the flag data output signal OUT_B at the ground voltage VSS level. The PMOS transistor P5 is turned on to output the flag data output signal OUT at the power voltage VDD level. The flag data output signal OUT is re-stored in the digital block 200.

When the power voltage VDD drops below a critical voltage, the flag data input signals IN, IN_B are reset at the ground voltage VSS level. The write enable signals WEN is at a low level, so that the NMOS transistors N13, N14 are turned off.

As a result, states of the storage nodes SN5, SN6 are maintained for a given amount of time. The maintaining time period of the storage nodes SN5, SN6 is determined by the capacity of the ferroelectric capacitor FC4 and the amount of leakage current flowing in the NMOS transistors N13~N16.

When the capacity of the ferroelectric capacitor FC4 is large and the amount of leakage current flowing in the NMOS transistors N13~N16 is small, the maintaining time period becomes longer. As a result, a flag data is maintained for a given amount of time subsequent to when a power source is turned off.

When a level of the power voltage VDD rises again, the flag data input signal IN rises from a reset state to the power voltage VDD level. When the power voltage VDD does not drop below a critical voltage, the flag data input signal IN rises from the dropped voltage level to the power voltage VDD level.

The write enable signal WEN is at the high level again. The NMOS transistors N13, N14 are turned on to charge the storage node SN5.

Figure 5:
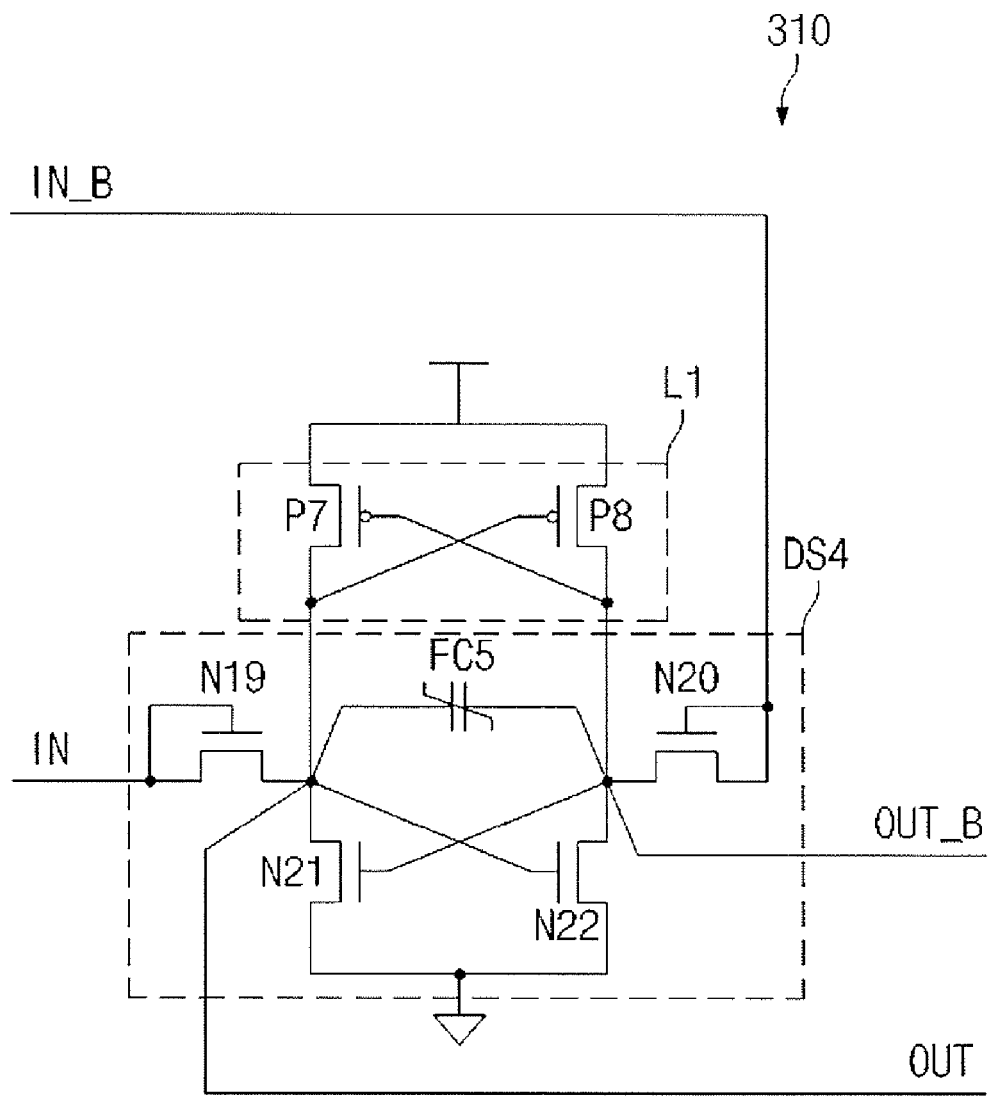
FIG. 5 is a circuit diagram illustrating a memory unit according to an embodiment of the present invention.

FIG. 5 is a circuit diagram illustrating the memory unit 310 according to an embodiment of the present invention.

The memory unit 310 includes a latch unit L1 and a data storage unit DS4.

The latch unit L1 includes PMOS transistors P7, P8 cross-coupled to have a latch structure. The PMOS transistor P7 is connected between a power voltage terminal and a flag data output signal OUT output terminal in which the gate of the PMOS transistor P7 is connected to a flag data output signal OUT_B output terminal. The PMOS transistor P8 is connected between the power voltage terminal and the flag data output signal OUT_B output terminal in which the gate of the PMOS transistor P7 is connected to the flag data output signal OUT output terminal.

The data storage unit DS4 includes NMOS transistors N19~N22 and a ferroelectric capacitor FC5. The NMOS transistor N19, which is a transmission element, is connected between a flag data input signal IN receiving terminal and the flag data output signal OUT output terminal in which the gate of the NMOS transistor N19 receives the flag data input signal IN.

The NMOS transistor N20, which is a transmission element, is connected between the flag data output signal OUT_B output terminal and a flag data input signal IN_B receiving terminal in which the gate of the NMOS transistor N20 receives the flag data input signal IN_B.

The NMOS transistors N21, N22, which are latch units, are cross-coupled to have a latch structure. The NMOS transistor N21 is connected between the flag data output signal OUT output terminal and a ground voltage terminal in which the gate of the NMOS transistor N21 is connected to the flag data output signal OUT_B output terminal.

The NMOS transistor N22 is connected between the flag data output signal OUT_B output terminal and the ground voltage terminal in which the gate of the NMOS transistor N22 is connected to the flag data output signal OUT output terminal. The ferroelectric capacitor FC5 is connected between the flag data output signal OUT output terminal and the flag data output signal OUT_B output terminal.

Hereinafter, the operation of the memory unit 310 is described.

In a write mode, when the flag data input signal IN is applied at a power voltage VDD level, the NMOS transistor N19 is turned on. The NMOS transistor N20 keeps being turned-off.

A voltage of the flag data input signal IN is charged in the ferroelectric capacitor FC5 and the flag data output signal OUT output terminal. The NMOS transistor N22 is turned on to discharge a potential of the flag data output signal OUT_B output terminal to the ground voltage terminal.

The PMOS transistor P7 is also turned on to output the flag data output signal OUT at the power voltage VDD level.

When the power voltage VDD drops below a critical voltage, the flag data input signals IN, IN_B are reset at the ground voltage VSS level. Accordingly, the NMOS transistors N19, N20 are turned off.

As a result, states of the flag data output signal OUT, OUT_B output terminals are maintained for a given time period. The maintaining time period of the flag data output signal OUT, OUT_B output terminals is determined by the capacity of the ferroelectric capacitor FC5 and the amount of leakage current flowing in the NMOS transistors N19~N22.

When the capacity of the ferroelectric capacitor FC5 is large and the amount of leakage current flowing in the NMOS transistors N19~N22 is small, the maintaining time period becomes longer. As a result, a flag data is maintained for a given time period when a power source is off.

When a level of the power voltage VDD rises again, the flag data input signal IN rises from a reset state to the power voltage VDD level. When the power voltage VDD does not drop below a critical voltage, the flag data input signal IN rises from the dropped voltage level to the power voltage VDD level.

The NMOS transistor N19 is turned on, so that a potential of the flag data output signal OUT output terminal is recharged.

Figure 6:
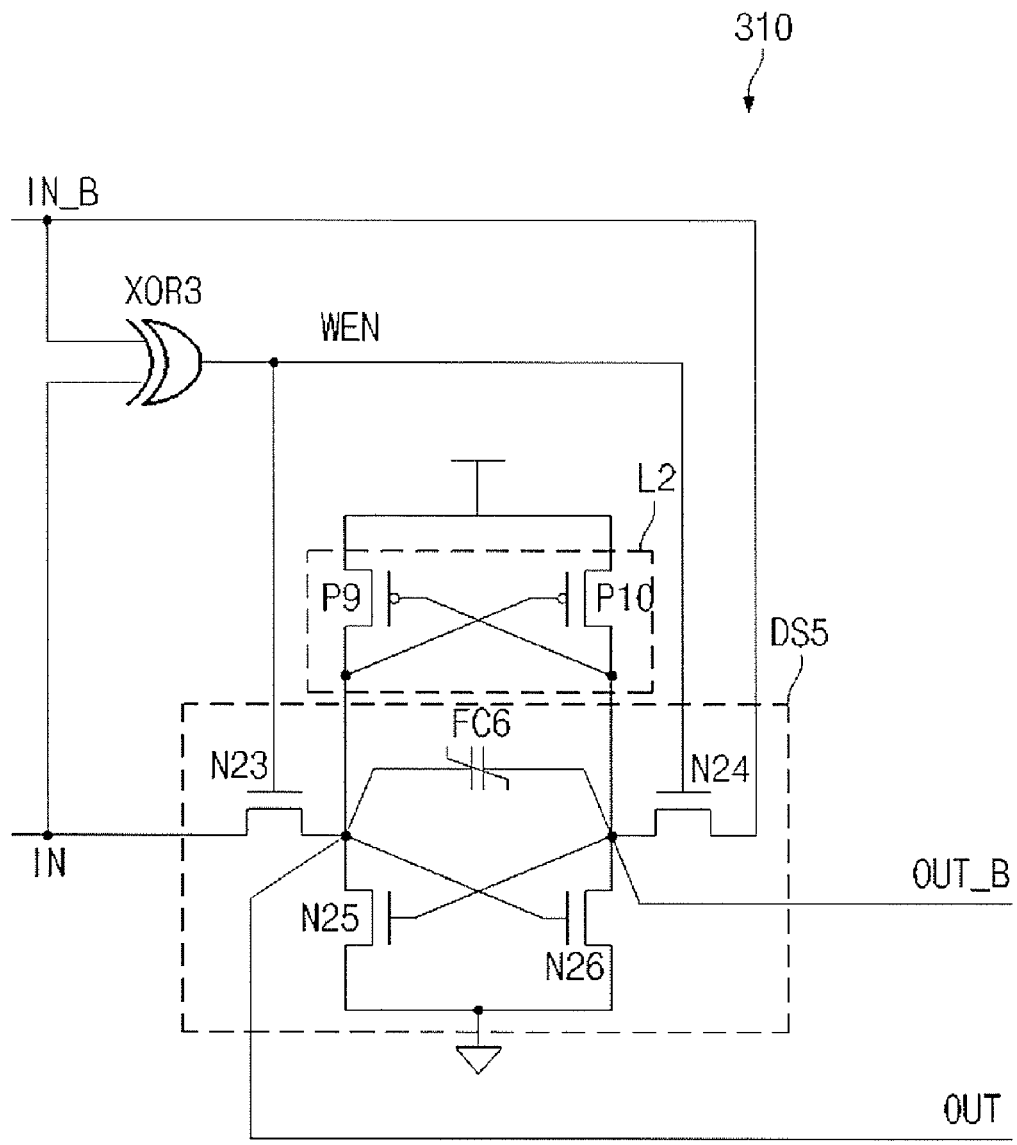
FIG. 6 is a circuit diagram illustrating a memory unit according to an embodiment of the present invention.

FIG. 6 is a circuit diagram illustrating the memory unit 310 according to an embodiment of the present invention.

The memory unit 310 includes an exclusive OR gate XOR3, a latch unit L2 and a data storage unit DS5.

The exclusive OR gate XOR3, which is a comparator, compares the flag data input signal IN with the flag data input signal IN_B. The exclusive OR gate XOR3 performs an exclusive OR operation on the flag data input signal IN with the flag data input signal IN_B, and outputs a write enable signal WEN.

The latch unit L2 includes PMOS transistors P9, P10 cross-coupled to have a latch structure. The PMOS transistor P9 is connected between a power voltage terminal and a flag output signal OUT output terminal in which the gate of the PMOS transistor P9 is connected to a flag data output signal OUT_B output terminal.

The PMOS transistor P10 is connected between the power voltage terminal and the flag data output signal OUT_B output terminal in which the gate of the PMOS transistor P10 is connected to the flag data output signal OUT output terminal.

The data storage unit DS5 includes NMOS transistors N23~N26 and a ferroelectric capacitor FC6. The NMOS transistor N23, which is a transmission element, is connected between a flag data input signal IN receiving terminal and the flag data output signal OUT output terminal in which the gate of the NMOS transistor N23 receives a write enable signal WEN.

The NMOS transistor N24, which is a transmission element, connected between the flag data output signal OUT_B output terminal and a flag data input signal IN_B receiving terminal in which the gate of the NMOS transistor N24 receives the write enable signal WEN.

The NMOS transistors N25, N26 are cross-coupled to have a latch structure. The NMOS transistor N25 is connected between the flag data output signal OUT output terminal and a ground voltage terminal in which the gate of the NMOS transistor N25 is connected to the flag data output signal OUT_B output terminal.

The NMOS transistor N26 is connected between the flag data output signal OUT_B output terminal and the ground voltage terminal in which the gate of the NMOS transistor N26 is connected to the flag data output signal OUT output terminal. The ferroelectric capacitor FC6 is connected between the flag data output signal OUT output terminal and the flag data output signal OUT_B output terminal.

Hereinafter, the operation of the memory unit 310 is described.

In a write mode, the flag data input signal IN is applied at a power voltage VDD level, and the flag data input signal IN_B is applied at a ground voltage VSS level.

The flag data input signal IN has a logic opposite to that of the flag data input signal IN_B, so that the write enable signal WEN is outputted at a high level. As a result, the NMOS transistors N23, N24 are turned on simultaneously.

A voltage of the flag data input signal IN is charged in the ferroelectric capacitor FC6 and the flag data output signal OUT output terminal. The NMOS transistor N26 is turned on to discharge a potential of the flag data output signal OUT_B output terminal to the ground voltage terminal.

The PMOS transistor P9 is turned on to output the flag data output signal OUT at the power voltage VDD level.

When the power voltage VDD drops below a critical voltage, the flag data input signals IN, IN_B are reset at the ground voltage VSS level. The write enable signals WEN is at a low level.

As a result, states of the NMOS transistors N23, N24 turned off, so that states of the flag data output signal OUT, OUT_B output terminals are maintained for a given time period. The maintaining time period of the flag data output signal OUT, OUT_B output terminals is determined by the capacity of the ferroelectric capacitor FC6 and the amount of leakage current flowing in the NMOS transistors N23~N26.

When the capacity of the ferroelectric capacitor FC6 is large and the amount of leakage current flowing in the NMOS transistors N23~N26 is small, the maintaining time period becomes longer. As a result, a flag data is maintained for a given time period subsequent to when the power source is turned off.

When a level of the power voltage VDD rises again, the flag data input signal IN rises from a reset state to the power voltage VDD level. When the power voltage VDD does not drop below a critical voltage, the flag data input signal IN rises from the dropped voltage level to the power voltage VDD level.

The write enable signal WEN is at the high level again. The NMOS transistors N23, N24 are turned on to charge a potential of the flag data output signal OUT output terminal.

Figure 7:
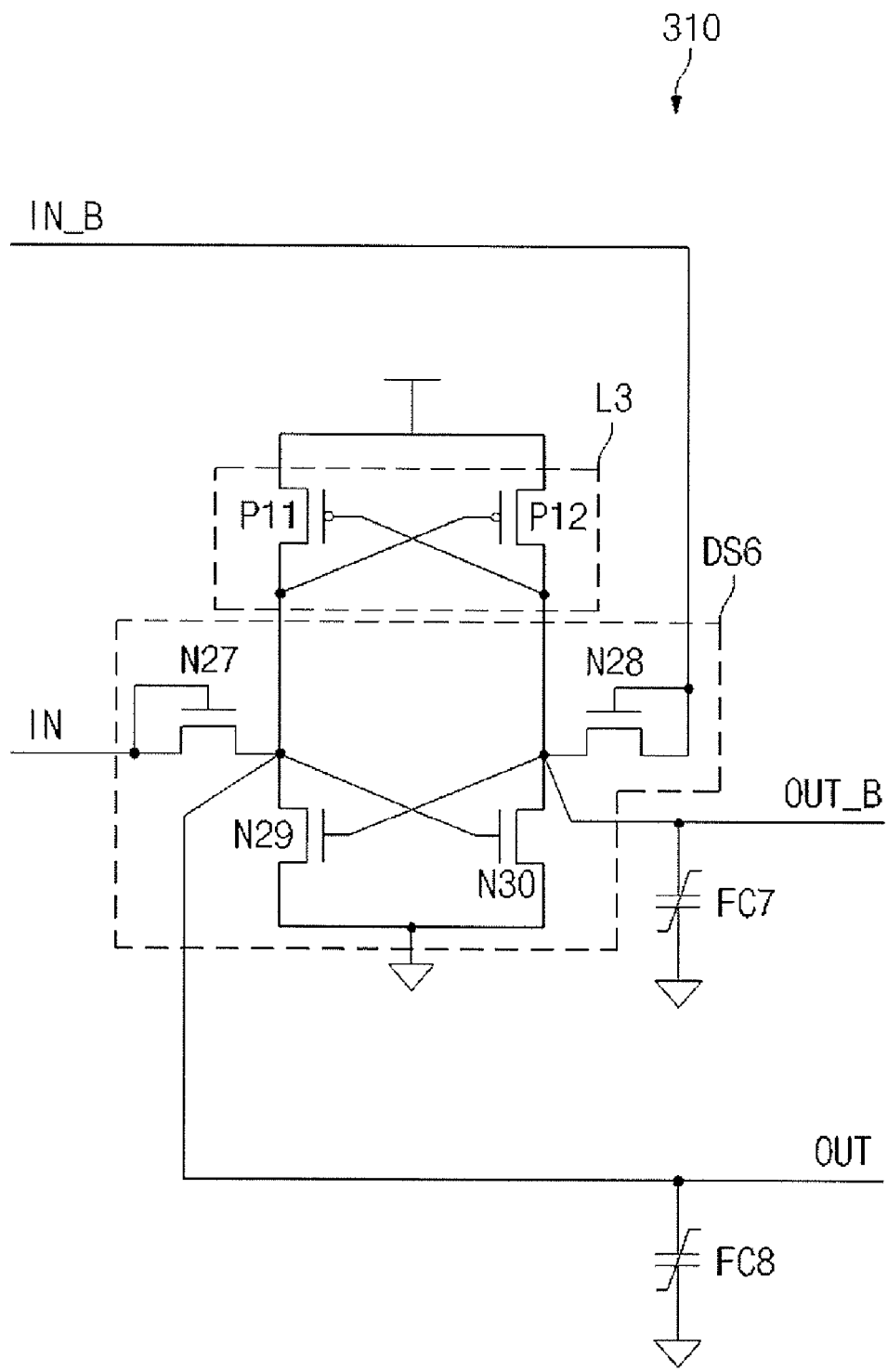
FIG. 7 is a circuit diagram illustrating a memory unit according to an embodiment of the present invention.

FIG. 7 is a circuit diagram illustrating the memory unit 310 according to an embodiment of the present invention.

The memory unit 310 includes a latch unit L3, a data storage unit DS6 and ferroelectric capacitors FC7, FC8.

The latch unit L3 includes PMOS transistors P11, P12 cross-coupled to have a latch structure. The PMOS transistor P11 is connected between a power voltage terminal and a flag data output signal OUT output terminal in which the gate of the PMOS transistor P11 is connected to a flag data output signal OUT_B output terminal. The PMOS transistor P12 is connected between the power voltage terminal and the flag data output signal OUT_B output terminal in which the gate of the PMOS transistor P12 is connected to the flag data output signal OUT output terminal.

The data storage unit DS6 includes NMOS transistors N27 to N30. The NMOS transistor N27, which is a transmission element, is connected between a flag data input signal IN receiving terminal and the flag data output signal OUT output terminal in which the gate of the NMOS transistor N27 receives the flag data input signal IN. The NMOS transistor N28, which is a transmission element, is connected between the flag data output signal OUT_B output terminal and a flag data input signal IN_B receiving terminal in which the gate of the NMOS transistor N28 receives the flag data input signal IN_B.

The NMOS transistors N29, N30, which are latch units, are cross-coupled to have a latch structure. The NMOS transistor N29 is connected between the flag data output signal OUT output terminal and a ground voltage terminal in which the gate of the NMOS transistor N29 is connected to the flag data output signal OUT_B output terminal.

The NMOS transistor N30 is connected between the flag data output signal OUT_B output terminal and the ground voltage terminal in which the gate of the NMOS transistor N30 is connected to the flag data output signal OUT output terminal.

The ferroelectric capacitor FC7, which is a storage element, is connected between the flag data output signal OUT_B output terminal and the ground voltage terminal. The ferroelectric capacitor FC8 is connected between the flag data output signal OUT output terminal and the ground voltage terminal.

Hereinafter, the operation of the memory unit 310 is described.

When the flag data input signal IN is applied at a power voltage VDD level, the NMOS transistor N27 is turned on. As a result the NMOS transistor N28 is maintained in a turned-off condition.

A voltage of the flag data input signal IN is charged in the ferroelectric capacitor FC8 and the flag data output signal OUT output terminal. The NMOS transistor N30 is turned on to discharge a potential of the flag data output signal OUT_B output terminal to the ground voltage terminal.

The PMOS transistor P11 is turned on to output the flag data output signal OUT at the power voltage VDD level.

When the power voltage VDD drops below a critical voltage, the flag data input signals IN, IN_B are reset at the ground voltage VSS level. The NMOS transistors N27, N28 are turned off.

As a result, states of the flag data output signal OUT, OUT_B output terminals are maintained for a given amount of time. The duration of this maintaining time period of the flag data output signal OUT, OUT_B output terminals is dependent upon the capacity of the ferroelectric capacitor FC8 and the amount of leakage current flowing in the NMOS transistors N27~N30.

When the capacity of the ferroelectric capacitor FC8 is large and the amount of leakage current flowing in the NMOS transistors N27~N30 is small, the maintaining time period becomes longer. As a result, a flag data is maintained for a given time period subsequent to when a power source is turned off.

When a level of the power voltage VDD rises again, the flag data input signal IN rises from the ground voltage VSS level to the power voltage VDD level. When the power voltage VDD does not drop below a critical voltage, the flag data input signal IN rises from the dropped voltage level to the power voltage VDD level.

The NMOS transistor N27 is turned on, so that a potential of the flag data output signal OUT output terminal is recharged.

Figure 8:
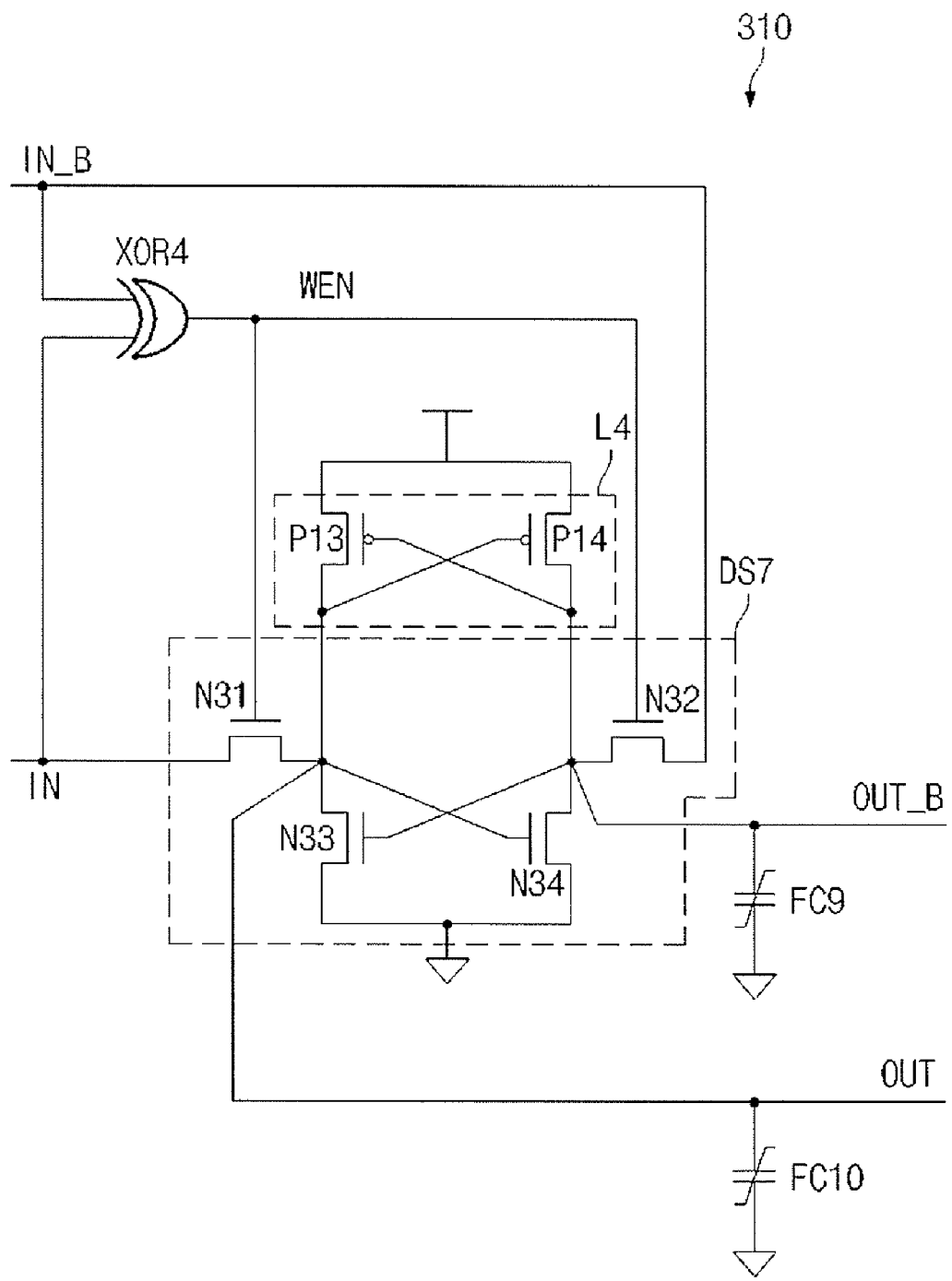
FIG. 8 is a circuit diagram illustrating a memory unit according to an embodiment of the present invention.

FIG. 8 is a circuit diagram illustrating the memory unit 310 according to an embodiment of the present invention.

The memory unit 310 includes an exclusive OR gate XOR4, a latch unit L4, a data storage unit DS7 and ferroelectric capacitors FC9, FC10.

The exclusive OR gate XOR4, which is a comparator, compares the flag data input signal IN with the flag data input signal IN_B. The exclusive OR gate XOR4 performs an exclusive OR operation on the flag data input signal IN with the flag data input signal IN_B, and outputs a write enable signal WEN.

The latch unit L4 includes PMOS transistors P13, P14. The PMOS transistors P13, P14 are cross-coupled to have a latch structure.

The PMOS transistor P13 is connected between a power voltage terminal and a flag output signal OUT output terminal in which the gate of the PMOS transistor P13 is connected to a flag data output signal OUT_B output terminal. The PMOS transistor P14 is connected between the power voltage terminal and the flag data output signal OUT_B output terminal in which the gate of the PMOS transistor P14 is connected to the flag data output signal OUT output terminal.

The data storage unit DS7 includes NMOS transistors N31~N34. The NMOS transistor N31, which is a transmission element, is connected between a flag data input signal IN receiving terminal and the flag data output signal OUT output terminal in which the gate of the NMOS transistor N31 receives a write enable signal WEN.

The NMOS transistor N32, which is a transmission element, connected between the flag data output signal OUT_B output terminal and a flag data input signal IN_B receiving terminal in which the gate of the NMOS transistor N32 receives the write enable signal WEN.

The NMOS transistors N33, N34 are cross-coupled to have a latch structure. The NMOS transistor N33 is connected between the flag data output signal OUT output terminal and a ground voltage terminal in which the gate of the NMOS transistor N33 is connected to the flag data output signal OUT_B output terminal.

The NMOS transistor N34 is connected between the flag data output signal OUT_B output terminal and the ground voltage terminal in which the gate of the NMOS transistor N34 is connected to the flag data output signal OUT output terminal.

The ferroelectric capacitor FC9 is connected between the flag data output signal OUT_B output terminal and the ground voltage terminal. The ferroelectric capacitor FC10 is connected between the flag data output signal OUT output terminal and the ground voltage terminal.

Hereinafter, the operation of the memory unit 310 is described.

In a write mode, the flag data input signal IN is applied at a power voltage VDD level, and the flag data input signal IN_B is applied at a ground voltage VSS level.

The flag data input signal IN has a logic opposite to that of the flag data input signal IN_B, so that the write enable signal WEN is outputted at a high level. As a result, the NMOS transistors N31, N32 are turned on simultaneously.

A voltage of the flag data input signal IN is charged in the ferroelectric capacitor FC10 and the flag data output signal OUT output terminal. The NMOS transistor N34 is turned on to discharge a potential of the flag data output signal OUT_B output terminal to the ground voltage terminal.

The PMOS transistor P13 is turned on to output the flag data output signal OUT at the power voltage VDD level.

When the power voltage VDD drops below a critical voltage, the flag data input signals IN, IN_B are reset at the ground voltage VSS level. The write enable signals WEN is outputted at a low level.

As a result, the NMOS transistors N31, N32 are turned off, so that states of the flag data output signal OUT, OUT_B output terminals are maintained for a given time period. The duration of the maintaining time period of the flag data output signal OUT, OUT_B output terminals is dependent upon the capacity of the ferroelectric capacitor FC10 and the amount of leakage current flowing in the NMOS transistors N31~N34.

When the capacity of the ferroelectric capacitor FC10 is large and the amount of leakage current flowing in the NMOS transistors N31 to N34 is small, the maintaining time period becomes longer. As a result, a flag data is maintained for a given time period when a power source is interrupted or terminated.

When a level of the power voltage VDD rises again, the flag data input signal IN rises from a reset state to the power voltage VDD level. When the power voltage VDD does not drop below a critical voltage, the flag data input signal IN rises from the dropped voltage level to the power voltage VDD level.

The write enable signal WEN is at the high level again. The NMOS transistors N31, N32 are turned on to re-charge a potential of the flag data output signal OUT output terminal.

As described above, according to an embodiment of the present invention, a RFID device 90 having a nonvolatile ferroelectric memory is configured to store a data processing state and value of a RFID tag while power supply is stopped.

The RFID device 90 having a nonvolatile ferroelectric memory may reduce a layout area with a ferroelectric capacitor of high capacity.

The RFID device 90 having a nonvolatile ferroelectric memory is configured to change and adjust a time for storing a data processing state and value of a RFID tag.

Although a number of illustrative embodiments consistent with the invention have been described, it should be understood that numerous other modifications and embodiments can be devised by those skilled in the art that will fall within the spirit and scope of the principles of this disclosure. More particularly, a number of variations and modifications are possible in the component parts and/or arrangements of the subject combinations arrangement within the scope of the disclosure, the drawings and the appended claims. In addition to variations and modifications in the component parts and/or arrangements, alternative uses will also be apparent to those skilled in the art.

What is claimed is:

1. A RFID device comprising:
an analog block configured to receive a radio frequency signal so as to output an operating command signal;
a digital block configured to generate and output an address and an operation adjusting signal in response to the operating command signal, output a response signal to the analog block, and generate a flag data corresponding to a data processing state and value; and
a memory block configured to read and write a data in a nonvolatile ferroelectric capacitor in response to the operation adjusting signal, wherein the memory block comprises a memory unit configured to store the flag data in a ferroelectric capacitor so as to output the flag data to the digital block,
wherein the memory unit stores the flag data for a given time when a power voltage supplied to the digital block drops below a critical voltage,
wherein the memory unit comprises:
a first data storage unit configured to store the flag data; and
an output driving unit configured to drive an output signal of the first data storage unit.

2. The RFID device according to claim 1,
wherein the first data storage unit comprises:
a first transmission element configured to transmit the flag data to a first storage node;
a second transmission element configured to transmit an inversion data of the flag data to a second storage node;
a first storage element configured to charge potentials at the first storage node and the second storage node; and
a first latch unit configured to latch the potentials at the first storage node and at the second storage node.

3. The RFID device according to claim 2,
wherein the first transmission element comprises a first NMOS transistor which is connected between a flag data receiving terminal and the first storage node and has a gate to receive the flag data.

4. The RFID device according to claim 2,
wherein the second transmission element comprises a second NMOS transistor connected between an inversion data receiving terminal and the second storage node in which the second NMOS transistor has a gate to receive the inversion data.

5. The RFID device according to claim 2,
wherein the first storage element comprises a first ferroelectric capacitor connected between the first and the second storage node.

6. The RFID device according to claim 2,
wherein the first latch unit comprises:
a third NMOS transistor connected between the first storage node and a ground voltage terminal, wherein the gate of the third NMOS transistor is connected to the second storage node; and
a forth NMOS transistor connected between, the second storage node and the ground voltage terminal, wherein the gate of the fourth NMOS transistor is connected to the first storage node, and wherein the gates of the third and fourth NMOS transistors being cross-coupled to each other.

7. The RFID device according to claim 2,
wherein the memory unit further comprises a first comparator configured to compare the flag data with the inversion data so as to output a write enable signal to the first and second transmission elements.

8. The RFID device according to claim 7,
wherein the first comparator comprises an XOR (exclusive OR) gate.

9. The RFID device according to claim 7,
wherein the first storage element comprises a second ferroelectric capacitor connected between the first storage node and the ground voltage terminal.

10. The RFID device according to claim 7,
wherein the first storage element comprises a third ferroelectric capacitor connected between the second storage node and the ground voltage terminal.

11. The RFID device according to claim 1,
wherein the output driving unit comprises:
a first driving unit configured to pull up the output signal of the first data storage unit; and
a second driving unit configured to pull down the output signal of the first data storage unit.

12. The RFID device according to claim 11,
wherein the first driving unit comprises:
a first PMOS transistor connected between a power voltage terminal and a first output terminal, wherein the gate of the first PMOS transistor is connected to a second output terminal; and
a second PMOS transistor connected between the power voltage terminal and the second output terminal, wherein the gate of the second PMOS transistor is connected to the first output terminal, and wherein the first and second PMOS transistor gates are cross-coupled to each other.

13. The RFID device according to claim 11,
wherein the second driving unit comprises:

a fifth NMOS transistor connected between the first output terminal and the ground voltage terminal, wherein the gate of the fifth NMOS transistor is connected to the second storage node; and a sixth NMOS transistor connected between the second output terminal and the ground voltage terminal, wherein the gate of the sixth NMOS transistor is connected to the first data storage unit.

14. The RFID device according to claim 1,
wherein the memory unit comprises:
a second data storage unit configured to store the flag data; and
a second latch unit configured to latch an output signal of the second data storage unit.

15. The RFID device according to claim 14,
wherein the second data storage unit comprises:
a third transmission element configured to transmit the flag data to a first output node;
a fourth transmission element configured to transmit an inversion data of the flag data to a second output node;
a second storage element configured to charge potentials at the first and the second output nodes; and
a third latch unit configured to latch the charged potentials of the first and second output nodes.

16. The RFID device according to claim 15,
wherein the third transmission element comprises a seventh NMOS transistor connected between a flag data receiving terminal and the first output node and the seventh NMOS transistor having a gate to receive the flag data.

17. The RFID device according to claim 15,
wherein the fourth transmission element comprises an eighth NMOS transistor connected between the inversion data of the flag data receiving terminal and the second output node and the eighth NMOS transistor having a gate to receive the inversion data of the flag data.

18. The RFID device according to claim 15,
wherein the second storage element comprises a fourth ferroelectric capacitor connected between the first output node and the second output node.

19. The RFID device according to claim 15,
wherein the third latch unit comprises:
a ninth NMOS transistor connected between the first output node and the ground voltage terminal, wherein the gate of the ninth NMOS transistor is connected to a second output node; and
a tenth NMOS transistor connected between the second output node and the ground voltage terminal, wherein the gate of the tenth NMOS transistor is connected to the first output node, and wherein the gates of the ninth and tenth transistors are cross-coupled with each other.

20. The RFID device according to claim 15,
wherein the memory unit further comprises a second comparator configured to compare the flag data with the inversion data of the flag data so as to output a write enable signal to the third and the fourth transmission elements.

21. The RFID device according to claim 20, wherein the second comparator comprises an XOR (exclusive OR) gate.

22. The RFID device according to claim 20, wherein the second storage element comprises a fifth ferroelectric capacitor which is connected between the first output node and the ground voltage terminal.

23. The RFID device according to claim 20,
wherein the second storage element comprises a sixth ferroelectric capacitor which is connected between the second output node and the ground voltage terminal.

* * * * *